United States Patent [19]

Colardelle et al.

[11] Patent Number: 4,496,798
[45] Date of Patent: Jan. 29, 1985

[54] RINGING CIRCUIT FOR TELEPHONE SUBSET, DESIGNED AS AN INTEGRATED CIRCUIT

[75] Inventors: Joël S. G. Colardelle, Les Ulis; Claude P. H. Lerouge, Maurepas; Nicole J. R. Loup, Vélizy-Villacoublay, all of France

[73] Assignee: International Standard Electric Corporation, New York, N.Y.

[21] Appl. No.: 523,544

[22] Filed: Aug. 16, 1983

[30] Foreign Application Priority Data

Aug. 17, 1982 [FR] France ............................. 82 14205

[51] Int. Cl.³ .......................................... H04M 1/00
[52] U.S. Cl. ................................. 179/84 T; 179/84 R
[58] Field of Search ............... 179/84 T, 84 R, 99 LS, 179/99 LC, 84 VF, 18 HB, 81 R

[56] References Cited

U.S. PATENT DOCUMENTS 4,066,848 1/1978 Darwood ......................... 179/84 R Primary Examiner—Gene Z. Rubinson
Assistant Examiner—James L. Dwyer
Attorney, Agent, or Firm—Peter R. Ruzek

[57] ABSTRACT

This ringing circuit detects the presence of the ringing signal on the subscriber line by means of a first circuit for detecting transition of the same direction in the ringing signal and of a second time measuring circuit for defining a validity window for the occurrence of a transition of desired direction and for providing a ringing control signal when the ringing signal is recognized. The ringing circuit is supplied by rectified AC ringing signals wherein a sufficient-voltage detection circuit is provided to authorized the operation of the ringing circuit.

8 Claims, 4 Drawing Figures

RINGING CIRCUIT FOR TELEPHONE SUBSET, DESIGNED AS AN INTEGRATED CIRCUIT

BACKGROUND OF THE INVENTION

This invention concerns a ringing circuit, designed as an integrated circuit, for a telephone set, intended to furnish a signal of a chosen audio frequency to a loudspeaker when the ringing signal is present on the telephone line supplying the said telephone set, the said ringing circuit being powered by the said ringing signal suitably rectified.

A bell is provided in subscriber' telephone sets which is driven by the calling signals coming from the exchange to which they are connected. These calling signals or ringing signals have well defined frequency and amplitude characteristics permitting them to be detected and to actuate the bell in the subscriber's set. These characteristics vary however from country to country. For crossbar exchanges in France, the ringing signals are alternating current signals having a frequency of 50 Hz an a level high enough (of about eighty volts) to directly actuate a conventional electromechanical bell.

However, these bells have the disadvantage of being rather bulky and of consuming a relatively large amount of power. Therefore, attempts have been made to replace these electromechanical bells by more economical and practical electronic ringing circuits, offering particularly a greater choice concerning the emitted sound.

Circuits of the analog type have thus been proposed using filters to detect a ringing signal of given characteristics. But, by their very designs, these circuits cannot be adapted easily for ringing signals having different characteristics. Furthermore, even though in certain cases, means were proposed to limit power consumption in the absence of a ringing signal, the ringing circuits proposed still draw continuously upon the dc voltage supply present in the subscriber's loop.

SUMMARY OF THE INVENTION

So, the object of this invention is an electronic ringing circuit which can faultlessly recognize the presence of a ringing signal in the subscriber's loop, while being easily adaptable to different frequency characteristics of this signal.

Another object of this invention is a ringing circuit which is supplied solely by the ringing signal and which consumes no power when no ringing signal is present.

According to the invention, these objects are achieved by the fact that the said ringing circuit comprises:

a clock circuit furnishing various clock signals from the signals of a stable oscillator;

a counter associated with a decoder, the said counter counting the pulses of a clock signal received from the clock circuit and being adapted to be reset by a first control signal and the said decoder furnishing from the content of the counter an initial signal, corresponding to the appearance of the initial code in the counter, and various time signals corresponding respectively to the passage of various periods of time after the initial signal;

a ring generator furnishing, from a clock signal delivered by the clock circuit, the said signal at audio frequency when it receives a second control signal; and a ringing signal detection system containing a circuit for detecting transitions in the same direction in the received ringing signal, circuit which furnishes the first control signal and a third control signal at the moment each transition having the said direction appears, and a circuit for measuring the elapsed time between two successive transitions detected by the transition detection circuit to determine if the ringing signal is present and to then furnish the said second control signal as long as it remains present.

Another characteristic of the invention lies in the fact that the said ringing circuit also includes a sufficient-voltage detection circuit to determine whether the rectified voltage, obtained from the ringing signal, is sufficient to ensure normal operation of the ringing circuit and to furnish an operate-enable signal to the ringing signal detection system which, without this enable signal, remains in the standby position.

BRIEF DESCRIPTION OF THE DRAWING

The invention will be better understood and other characteristics will be brought out in the following description and attached drawings in which.

DESCRIPTION OF THE PREFERRED EMBODIMENT

Figure 1:
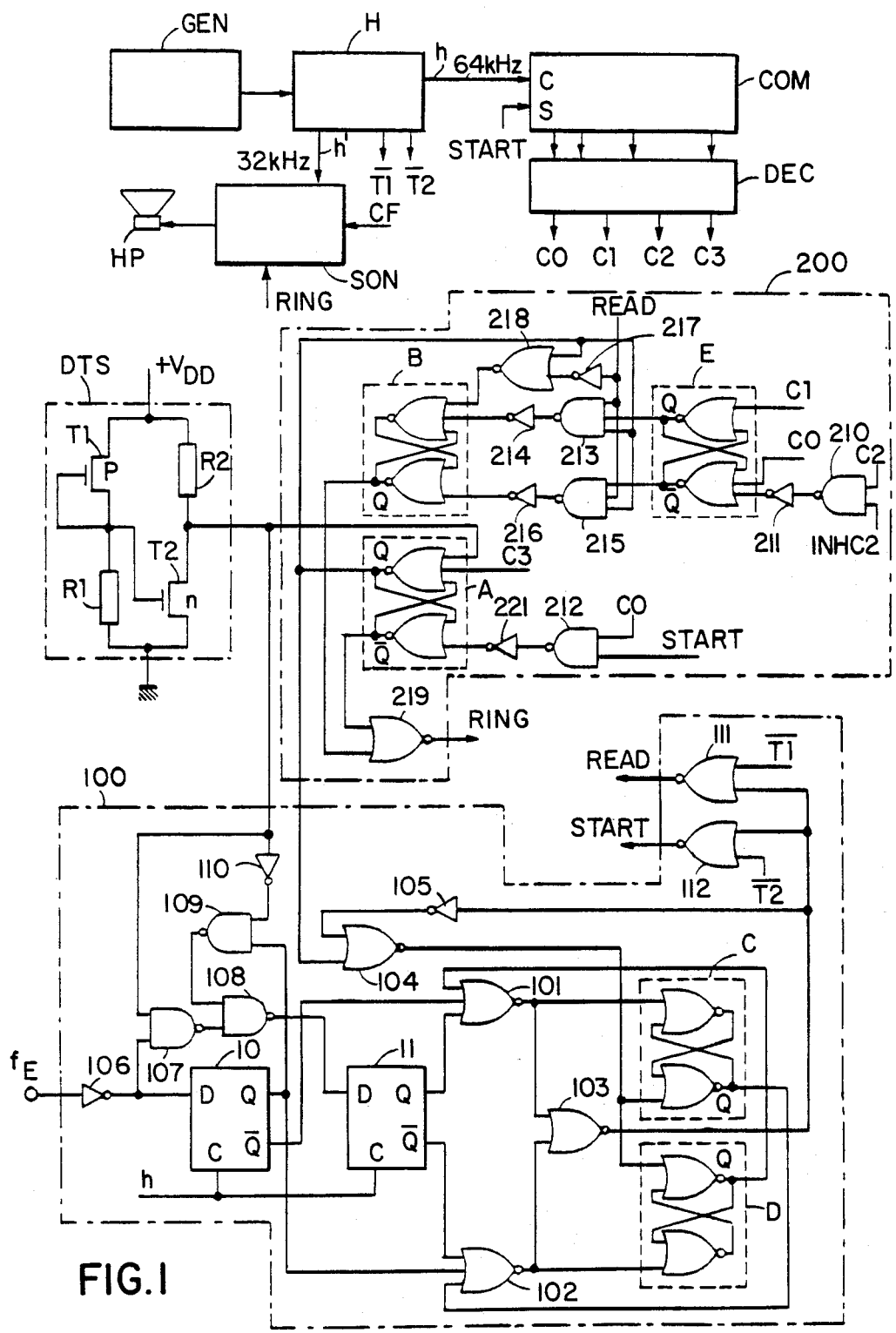
FIG. 1 is a diagram of the ringing circuit according to the invention.

The ringing circuit shown in FIG. 1 can be designed entirely as an MOS integrated circuit. It includes, on the one hand, a certain number of conventional circuits which are represented solely by blocks without going into the commonly known detail of their constructions and, on the other hand, circuits concerning the principle of the invention which are shown in greater detail.

The ringing circuit according to the invention comprises a clock circuit H receiving signals from a stable oscillator GEN, for example at four hundred fifty-five kilohertz, and furnishing after suitable division a first clock signal h at 6.4 kHz and two others signals $\overline{T1}$ and $\overline{T2}$ having the same frequency but shifted in time as well as a second clock signal h' at a higher frequency (thirty-two kilohertz, for example). This signal h' is sent to a ring generator SON, consisting mainly of a programmable divider whose division factor can be adjusted manually by the user by means of a control CF so as to obtain the preferred audio frequency from the loudspeaker HP. The ring generator SON furnishes a signal to the loudspeaker HP when it is authorized to do so by a control signal RING.

The clock signal h is sent to the input of a cyclic counter COM which is reset by a control signal START. This counter is coupled to a decoder DEC furnishing an initial signal C0 corresponding to the appearance of the initial code in the counter COM and several time signals C1, C2, C3, corresponding to the appearance of certain codes in the counter, obtained after predetermined periods of counting starting from the initial code.

The control signals RING and START are obtained from a ringing signal detection system containing a circuit 100 to detect transitions in the same direction in the received ringing signal of frequency $f_E$ and a circuit 200 which measures the time elapsed between two successive transitions detected by the circuit 100.

The ringing circuit also comprises a sufficient-voltage detection circuit DTS which receives as a supply voltage $+V_{DD}$, the voltage obtained by rectification (for example by a diode bridge not shown preceded by a resistor and a capacitor to isolate it from the dc voltage present on the subscriber's line) of the ac ringing voltage when the ringing signal is present on the line. Obviously, when the ringing signal is being established, the rectified voltage will increase gradually, as a result of the capacities, from zero up to the normal supply value. To prevent abnormal operation of the ringing circuit and any unwanted triggering of the ringing device, due to a voltage supply lower than required by the various components, the circuit DTS is designed to furnish an enable signal to the circuits 100 and 200 only when the voltage $+V_{DD}$ has exceeded a predetermined threshold value. For this purpose, the circuit DTS includes, in parallel with the terminals of the rectified supply, a first arm, formed by a p-type MOS transistor T1, whose gate and drain are connected together, and a resistor R1 in series, and a second arm, consisting of a resistor R2 in series with an n-type MOS transistor T2 whose gate is connected to the common point between transistor T1 and resistor R1, the enable signal being extracted at the common point between resistor R2 and transistor T2. When the supply voltage begins to increase, the two transistors T1 and T2 are cut off. When this voltage reaches a value VT equal to the threshold voltage of the MOS transistors (threshold voltage which can be assumed to be identical for both types of MOS transistors, although this is not essential), transistor T1 starts to conduct but transistor T2 remains cut off until the voltage across resistor R1 has reached the value VT. The output voltage is therefore at the high level. When the voltage across the terminals of resistor R1 reaches the value VT, which occurs for a voltage at the terminals of transistor T1 of about 2 VT, transistor T2 conducts and the output signal changes to the low level. The enable signal therefore consists of a low level, furnished as soon as the supply voltage $+V_{DD}$ exceeds a given value substantially equal to $+3$ VT.

The circuit 100 which detects transitions in the same direction receives the ringing signals of frequency $f_E$ and other ac signals present on the subscriber's line at an inverter 106 which converts them into square-wave signals. These square-wave input signals are applied to the input D of a first D-type flip-flop 10 whose clock input receives the clock signal h. The state of the flip-flop 10 is repeated, on the following clock pulse, by a second flip-flop 11 whose input D is connected either to the non-inverted output of flip-flop 10, or to its input through a logic circuit consisting of the NAND gates 107, 108, 109 and the inverter 110 and controlled by the cable signal from the sufficient-voltage detector circuit DTS. Two latches, C and D, are used to store the direction in which the first transition, detected in the input signal of frequency $f_E$, occurred. The detection of the transitions and the operation of the latches C and D are controlled by two NOR gates 101 and 102, comparing the states of flip-flops 10 and 11. The NOR gate 101, whose output controls latch C, has one input connected to the inverted output $\overline{Q}$ of flip-flop 10 and one input connected to the non-inverted output Q of flip-flop 11. The NOR gate 102, whose output controls latch D, has one input connected to the non-inverted output Q of flip-flop 10 and one input connected to the inverted output $\overline{Q}$ of flip-flop 11. Each of the two NOR gates has a third latch input connected to the output Q of the latch it does not control.

A third NOR gate 103, whose inputs are connected to the outputs of the two NOR gates 101 and 102, furnishes a detected-transition signal to two NOR gates 111 and 112 which make it coincide respectively with the shifted clock signals $\overline{T1}$ and $\overline{T2}$ in order to furnish successively a control signal READ and then a control signal START. A circuit to reset the latches C and D consists of an inverter 105, connected to the output of the NOR gate 103, and a NOR gate 104.

The time-measuring circuit 200 contains a first function latch A which, depending upon its state, places the detection system in the standby or measuring position. The standby position is characterized by a logical 0 level at the output Q of latch A which is forced to this state if the enable signal from the circuit DTS is absent (high level) or if the decoder DEC sends the time signal C3 to it, corresponding to the end of counting (maximum count) of the counter COM. Latch A changes to state 1 (measuring position) by command of the control signal START coinciding with the appearance of the initial signal C0 transmitted through a NAND gate 212 and an inverter 221.

The circuit 200 also includes a measurement latch circuit E which determines, when its output Q is in the state 0, a validity window for the appearance of a transition in the same direction as the first transition which was detected by circuit 100. This latch E is set to the state 0 by the time signal C1 and reset to state 1 either by the initial signal C0, or by the time signal C2. In certain cases, the action of the signal C2 can be inhibited by means of a signal INHC2 through the NAND gate 210 and inverter 211. A third read latch B is connected to latch E and to latch A by means of a logic circuit consisting of NAND gates 213, 215, inverters 214, 216, 217 and the NOR gate 218. This logic circuit is controlled by the READ signal and enables the repetition by latch B of the state of the latch E when latch A is in the measuring position or positions the latch B in the state corresponding to an invalid measurement, when latch A is in the standby position.

A NOR gate 219 furnishes the control signal RING and has its two inputs connected respectively to the output $\overline{Q}$ of latch A and to the output Q of latch B. Lastly, the output Q of latch A is also connected to one input of the NOR gate 104 of circuit 100.

The operation of the system will now be explained with reference to FIGS. 2 to 4.

The time signals C1, C2 and C3 were selected respectively to correspond to periods, starting from the initial signal C0, of 16.4 ms (one hundred sixth clock pulse after initialization), 49.8 ms (three hundred twentieth pulse) and 79.7 ms (five hundred eleventh pulse), which corresponds substantially to the frequencies of 60 Hz, 20 Hz and 12.5 Hz.

When an ac signal such as a ringing signal appears on the subscriber's line, the supply voltage $+V_{DD}$ starts to build up. As long as it is below the threshold $+3$ VT, the enable signal from the circuit DTS is absent and the high level it furnishes places the latch A in the state 0, thus in the standby position, blocks the NAND gate 109 and opens NAND gates 107 and 108, so that flip-flops 10 and 11 having their inputs connected together are forced to continually maintain identical states, regardless of the input signal $f_E$. Therefore transitions cannot be detected.

As soon as the rectified supply voltage $+V_{DD}$ exceeds the value $+3$ VT, the sufficient-voltage detection circuit DTS furnishes a level 0 enable signal which blocks the NAND gate 107 and opens the NAND gates 108 and 109, which connects the output Q of flip-flop 10 to the input of flip-flop 11. The transition detection circuit 100 is then operational. The two flip-flops 10 and 11 are in the same state.

The counter COM is in any position and counts the clock pulses h.

The latch circuit A in the state 0, (signal QA, FIG. 2), locks the latch circuits C and D in the state 0, by means of the NOR gate 104, the NOR gate 103 supplying a level 1 signal since the two NOR gates 101 and 102 both furnish a level 0 (flip-flops 10 and 11 in the same state). This signal from NOR gate 103 prevents a control signal READ or START from being furnished by the NOR gates 111 or 112.

The state of the latch E depends upon the counting level attained but has no effect at any rate (no READ signal). The state of the latch B remains the same as it reached at switch-on time and can be either 1 or 0, and the control signal RING cannot be furnished by gate 219 since the output $\overline{Q}$ of latch A, which is in the standby position (state 0), forces the transmission of a level 0 signal.

Figure 2:
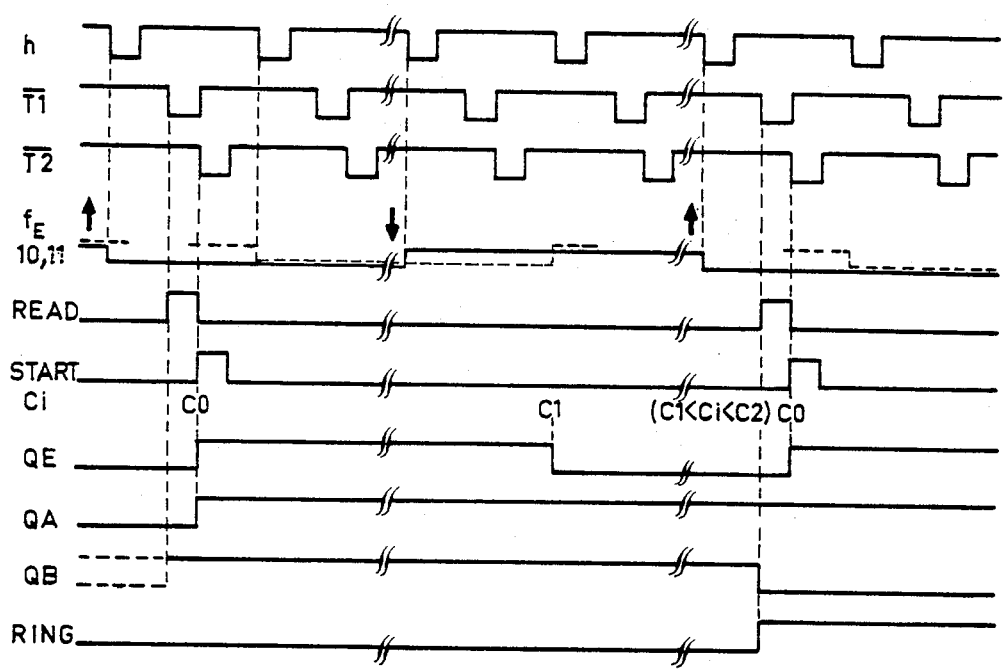
FIGS. 2 to 4 represent time diagrams of signals used to explain the operation of the circuit in FIG. 1 in various cases.

All of these states are summarized by the signals shown at the beginning of FIG. 2. An ac signal, in theory the awaited ringing signal, being present on the subscriber's line, a first transition (for example from the low level to the high level) occurs at the input of flip-flop 10, as shown schematically by an arrow for the signal $f_E$ in FIG. 2. Flip-flop 10 then changes state on the first clock pulse h which follows. During the entire period up to the next clock pulse which will provide the repetition of the state of flip-flop 10 by flip-flop 11, the outputs of flip-flops 10 and 11 are not identical. This causes a level 1 to appear at the output of one of the NOR gates 101 or 102, in this case gate 102, which makes the latch D changes to state 1. At the same time, the NOR gate 103 furnishes a level 0 until the next clock pulse. This permits the gates 111 and 112 to furnish in succession a control signal READ, then a control signal START.

The control signal READ places the latch B in the state 1 (signal QB in FIG. 2), if it was not already there since latch A is in the state 0. This causes the NOR gate 219 to furnish a RING signal of level 0. The control signal START resets the counter COM, the decoder DEC then furnishing an initial code signal C0 (value of code Ci in FIG. 2). In addition, it changes latch A to state 1, in measuring position, through the NOR gate 212 and inverter 221. Lastly, the initial signal C0 places latch E in state 1 (signal QE in FIG. 2) if it was not in that state.

After the next clock pulse, which permits the repetition by flip-flop 11 of the state of flip-flop 10, the NOR gate 103 again furnishes a level 1 signal which inhibits the output of other READ or START control signals. Thus, with the ringing circuit being in the measuring position, if a transition of opposite direction occurs (arrow pointed downward in FIG. 2), flip-flop 10 changes state on the following clock pulse. But, since the NOR gate 101 which should detect the disagreement between the states of flip-flops 10 and 11 is locked by the level 1 output signal of the latch D, this disagreement has no effect and flip-flop 11 repeats the state of flip-flop 10 on the following clock pulse.

When the counter COM has counted one hundred six pulses, a time signal C1 corresponding to the code C1 is furnished by the decoder DEC. This signal causes the measurement latch circuit E to change to state 0, which defines a validity window for the detection of a transition in the same direction for the entire period in which it remains in this state.

If such a transition in the input signal (second arrow pointed upward in FIG. 2) occurs before the appearance of the time signal C2, it is because the ac signal on the subscriber's line has a frequency of between sixty hertz and twenty hertz and it is concluded that a ringing signal is indeed present. On the first clock pulse following the transition, flip-flop 10 changes state. The disagreement between flip-flops 10 and 11 is detected in the manner already described above for the first transition and a control signal READ, then a START signal are delivered by circuit 100, the latch D remaining in state 1. The control signal READ triggers the repetition of the state of latch E by the latch B which therefore changes to state 0 since the measurement is valid (signal QB in FIG. 2). The NOR gate 219, then receiving two level 0 signals, furnishes a control signal RING at level 1 which actuates the ringing device through the generator SON.

The control signal START then resets the counter COM, which causes the appearance of an initial signal C0 to change latch E back to state 1, and thus triggers a new measuring period such as the one just described. As long as transitions in the same direction as the first continue to be detected within the validity windows defined by latch E, the control signal RING remains at level 1 and ringing continues.

Figure 3:
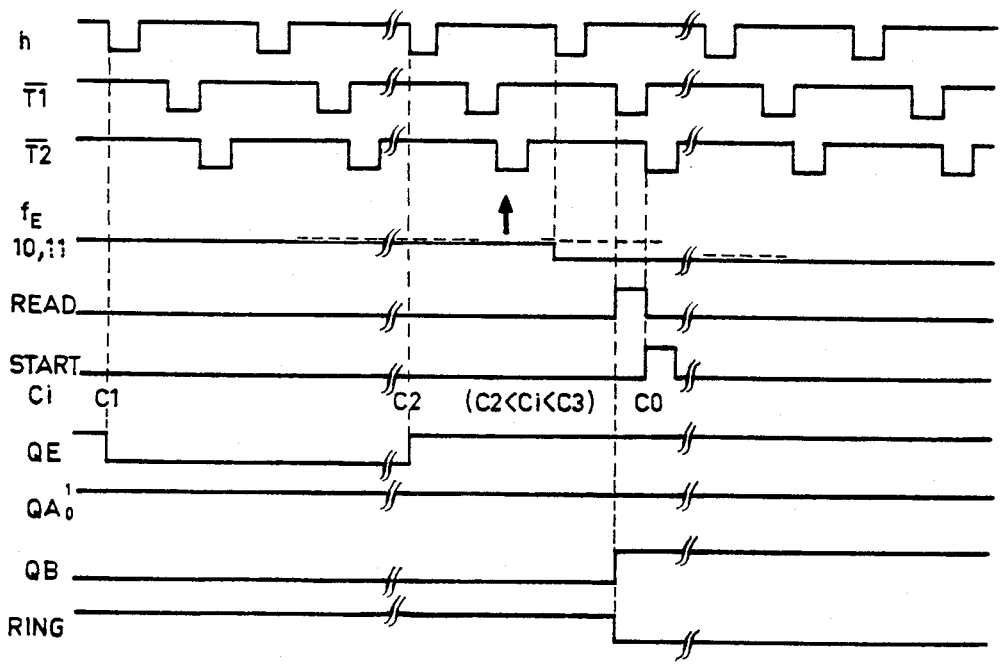

FIG. 3 illustrates the operation of the circuit according to the invention when a transition in the expected direction no longer occurs during the validity window but afterwards, the appearance of this transition (for example noise appearing just after the ringing signal disappears) occurring however before the longest counting time, corresponding to the time signal C3, has elapsed since the preceding detection of a transition. It can be seen that the appearance of the time signal C2 furnished by the decoder denotes the end of the validity window and the return of latch E to the state 1. The noise transition detected by circuit 100 causes the transmission of a control signal READ and then a control signal START, after the change of state of flip-flop 10. The READ signal orders the repetition of the state of latch E by the latch B which then changes to state 1. As a result, the control signal RING at the output of the NOR gate 219 changes to level 0 and the ringing stops.

The START signal resets the counter COM and triggers a new measuring period. Obviously, if the noise transition were to occur before the signal C1 instead of after the signal C2, the operation would be the same.

Figure 4:
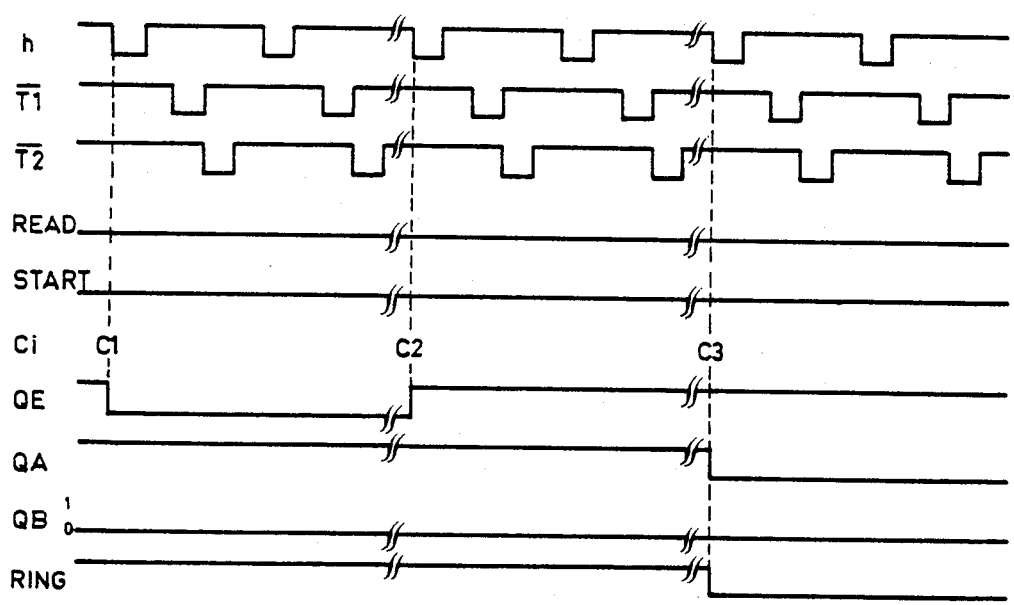

FIG. 4 illustrates the case in which the ringing signal has just stopped on the subscriber's line and in which there are no noise signals. In this case, the counter COM reaches its maximum count without anything happening, except for the latch circuit E which changed to the state 0 between the time signals C1 and C2. At the end of the counting, the time signal C3 appears. This signal C3 causes latch A to change to the state 0, which changes the RING signal to the level 0 and triggers a new standby period for the ringing circuit according to the invention, with the latches C and D being reset to zero by the NOR gate 104. Naturally, if the ringing signal does not reappear, at the end of a given time the supply voltage also disappears.

One of the advantages of the ringing circuit according to the invention is that it examines the frequency of the ringing signal over an entire period of the signal, therefore with much greater assurance. Furthermore, it is clear that any desired validity window can be selected by modifying the decoder.

In the time-measuring circuit 200, a NAND gate 210 followed by an inverter 211 has been provided in order to permit the action of the time signal C2 on the latch E to be inhibited by a signal INHC2 at the level 0. This permits the validity window to be extended up to the signal C3, for example to permit detection of a ringing signal at a frequency of 16.5 Hz.

Of course, the above described embodiment in no way limits the scope of this invention.

We claim:

1. A ringing circuit for a telephone set, designed as an integrated circuit, intended to furnish a signal at a chosen audio frequency to a loudspeaker when the ringing signal is present on the telephone line supplying the said telephone set, the said ringing circuit being powered by the said ringing signal suitably rectified, characterized in that the said ringing circuit comprises:

a clock circuit (H) furnishing various clock signals (h, $\overline{T1}$, $\overline{T2}$, h') from the signals of a stable oscillator (GEN);

a counter (COM) associated with a decoder (DEC), the said counter counting the pulses of a first one (h) of the various clock signals received from the clock circuit (H) and being adapted to be reset by a first control signal (START) and the said decoder furnishing from the content of the counter an initial signal (C0), corresponding to the appearance of the initial code in the counter, and various time signals (C1, C2, C3) corresponding respectively to the passage of various periods of time after the initial signal;

a ring generator (SON) furnishing, from a second one (h') of the various clock signals delivered by the clock circuit (H), the said signal at audio frequency when it receives a second control signal (RING); and a ringing signal detection system (100, 200) containing a circuit (100) for detecting transitions in the same direction in the received ringing signal, circuit which furnishes the first control signal (START) and a third control signal (READ) at the moment each transition having the said direction appears, and a circuit (200) receiving the initial signal (C0) and the various time signals (C1, C2, C3) for measuring the elapsed time between two successive transitions, detected by the transition detection circuit (100), to determine if the ringing signal is present and to then furnish the said second control signal (RING) as long as it remains present.

2. A ringing circuit according to claim 1, characterized in that it also includes a sufficient-voltage detection circuit (DTS) to determine whether the rectified voltage obtained from the ringing signal is sufficient to ensure normal operation of the ringing circuit and to furnish an operate-enable signal to the ringing signal detection system (100, 200) which, without this enable signal, remains in the standby position.

3. A ringing circuit according to claim 2, characterized in that the said sufficient-voltage detection circuit (DTS) includes, in parallel with the terminals of the rectified voltage supply, a first arm containing an MOS transistor (T1) of a first type (p or n), whose source is connected to a first terminal of the supply and whose gate and drain, connected together, are connected to the other terminal of the supply through a first resistor (R1), and a second arm containing an MOS transistor (T2) of a second type (n or p), whose source is connected to the said other terminal and whose drain is connected through a second resistor (R2) to the first terminal of the supply, the gate of this transistor (T2) of the second arm being connected to the common point between the first resistor and the transistor of the first arm and the enable signal being extracted at the common point between the second resistor and the transistor of the second arm.

4. A ringing circuit according to claim 1, characterized in that the said circuit (100) for detecting transitions in the same direction comprises:

a first D-type flip-flop (10) whose input (D) receives the said ringing signal from the telephone line and a second D-type flip-flop (11) repeating the state of the first flip-flop (10) on the following pulse of the first clock signal (h);

two latch circuits (C, D) storing the direction in which the first detected transition took place;

a first logic circuit (101, 102, 103) to control the state of the said latches (C, D) from the comparison of the state of the said D-type flip-flops (10, 11) and to furnish a detected-transition signal when a transition of the desired direction has occurred, the state of the said latches being retransmitted to the said first logic circuit in order to inhibit any further change-of-state order by a transition in the other direction, after a first transition has caused one of the latches (C, D) to change state; and two coincidence gates (111, 112), receiving the said detected-transition signal and a third (T1) and fourth (T2) ones of said various clock signals properly shifted, to furnish successively the third control signal (READ) and then the first control signal (START) when a transition in the desired direction is detected.

5. A ringing circuit according to claim 4, characterized in that the said first logic circuit (101, 102, 103) comprises:

a first NOR gate (101) whose inputs are connected to the inverted output of the first D-type flip-flop (10), to the non-inverted output of the second flip-flop (11) and to the output of the second latch (D), and whose output controls the first latch (C);

a second NOR gate (102) whose inputs are connected to the non-inverted output of the first D-type flip-flop (10), to the inverted output of the second flip-flop (11) and to the output of the first latch (C), and whose output controls the second latch (D); and a third NOR gate (103) whose inputs are connected to the outputs of the first two NOR gates (101, 102) and whose output furnishes the said detected-transition signal.

6. A ringing circuit according to claim 4, characterized in that the circuit (100) for the detection of transitions in the same direction also includes a second logic circuit (107, 108, 109, 110) used to connect to the input (D) of the second flip-flop (11) either the non-inverted output of the first flip-flop (10), or its input (D), depending upon whether the said enable signal is present or not.

7. A ringing circuit according to claim 1, characterized in that the said time-measuring circuit (200) comprises:

a first function latch (A) which, according to its state, places the detection system (100, 200) in the standby position or in the measuring position, the standby state being specified by the absence of the enable signal from a sufficient-voltage detection circuit (DTS) or by the time signal (C3) from the decoder (DEC) corresponding to the longest possible counting time for the counter (COM), without the appearance of a ringing signal transition during that time, and the measuring state being specified by the appearance of the first control signal (START);

a second measurement latch (E) which defines, when it is in a predetermined state, a validity window for the appearance of a transition in the same direction, the change to the said predetermined state controlled by a first time signal (C1) corresponding to the minimum value of the period of the ringing signal to be detected and the return to the other state being controlled by the appearance of a second time signal (C2), corresponding to a maximum value of the period of the ringing signal, or of the initial signal (C0);

a third read latch (B);

a third logic circuit (213 to 218) authorizing the repetition of the state of the second latch (E) by the third latch (B) under the command of the third control signal (READ) corresponding to the detection of a transition in the desired direction, when the first latch (A) is in the measuring state, and positioning the said third latch (B) in the state not corresponding to a valid measurement, under the command of the third control signal (READ), when the first latch (A) is in the standby state; and a coincidence gate (219) furnishing the second control signal (RING) when the first latch (A) is in the measuring state and the third latch is in the state corresponding to a valid measurement.

8. A ringing circuit according to claim 7, characterized in that the validity window can be extended by sending to the said time-measuring circuit (200) an inhibit signal (INHC2) which inhibits the action of the second time signal (C2) on the second latch (E).

* * * * *